United States Patent
Azam et al.

(10) Patent No.: US 9,665,379 B2
(45) Date of Patent: May 30, 2017

(54) SYSTEM AND METHOD FOR BOOTING A COMPUTER SYSTEM USING PREBOOT DATA

(75) Inventors: Syed S. Azam, Houston, TX (US); Zubair Beyabani, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1515 days.

(21) Appl. No.: 13/133,944

(22) PCT Filed: Dec. 18, 2008

(86) PCT No.: PCT/US2008/087420
§ 371 (c)(1),
(2), (4) Date: Jun. 9, 2011

(87) PCT Pub. No.: WO2010/071650
PCT Pub. Date: Jun. 24, 2010

(65) Prior Publication Data
US 2011/0320800 A1    Dec. 29, 2011

(51) Int. Cl.
*G06F 9/00* (2006.01)
*G06F 15/177* (2006.01)
*G06F 9/44* (2006.01)

(52) U.S. Cl.
CPC .................... *G06F 9/4416* (2013.01)

(58) Field of Classification Search
CPC ............ G06F 9/44502; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 7,257,704 B2* | 8/2007 | O'Neal | 713/2 |
| 7,506,151 B2* | 3/2009 | Miyamoto et al. | 713/2 |
| 7,882,345 B1* | 2/2011 | Christensen | 713/2 |
| 2002/0073303 A1 | 6/2002 | French et al. | |
| 2003/0005096 A1* | 1/2003 | Paul et al. | 709/222 |
| 2003/0126426 A1 | 7/2003 | Frye, Jr. | |
| 2005/0055691 A1 | 3/2005 | O'Neal | |
| 2005/0149716 A1 | 7/2005 | Nair et al. | |

(Continued)

FOREIGN PATENT DOCUMENTS

| | | |
|---|---|---|
| CN | 101055539 A | 10/2007 |
| TW | 200533118 A | 10/2005 |

OTHER PUBLICATIONS

WIPO, International Search Report, mailed Sep. 11, 2009, PCT/US2008/087420, filed Dec. 18, 2008.

(Continued)

*Primary Examiner* — Zahid Choudhury
(74) *Attorney, Agent, or Firm* — International IP Law Group PLLC

(57) ABSTRACT

Exemplary embodiments of the present invention disclosed herein relate to a method of booting a computer system using preboot data. A method in accordance with an exemplary embodiment of the present invention comprises transmitting a boot request and receiving, in response to the boot request, a boot loader that is adapted to read preboot data. The exemplary method may additionally comprise transmitting a request for boot data corresponding to the preboot data, receiving boot data corresponding to the preboot data, and booting the computer system using the boot data.

13 Claims, 4 Drawing Sheets

(56) References Cited

U.S. PATENT DOCUMENTS

2006/0010315 A1* 1/2006 Brown et al. ............... 713/2
2007/0198819 A1 8/2007 Dickens
2007/0198820 A1 8/2007 Dickens

OTHER PUBLICATIONS

Anderson—"DMIDECODE: dmidecode for DOS?", In: lists.nongnu.org—Sep. 10 2005—2 pages.
Cruz, T et al: Enabling preOS desktop management, In: IFP/EEE Eighth International Symposium on integrated Network Management, 2003—321-334.
Demers, P.: Using the PC Asset Tag number in the PC Name for imaging. Novell Cool Solutions: Feature. Dec. 1, 2006. URL:http://www.novell.com/—6 pages.
Desktop Management Interface, In: Wikipedia, the free encyclopedia. Bearbeitungsstand: Sep. 27, 2008, URL: http//en.wikipedia.org/—2 pages.
Etherboot command-line. In: Etherboot Project. Bearbeitungsstand; Aug. 7, 2008. URL: http://etherboot.org/—4 pages.
HP; Rapid Deployment Pack, Knowledge base, URL: http://h 18013. www1. h p.com/products/servers/management/—2 pages.
Intel Corporation: Preboot execution environment (PXE) specification. Version 2.1. 20.09.1999. URL: http://download:intel.com/design/archives/—104 pages.
TONi: We use ZENworks Pxe imaging. ZENworks on Novel Open Audio. Jun. 16, 2006. URL: http://www.novell.com/—4 pages.
Using EtherBoot as a PXE boot ram. In: Etherboot Project. Bearbeitungsstand: Jul. 16, 2006, URL; http://etherboot.org/wiki/pxe—1 page.

* cited by examiner

SYSTEM AND METHOD FOR BOOTING A COMPUTER SYSTEM USING PREBOOT DATA

BACKGROUND

In computer networks having a mixed information technology (IT) infrastructure, some client machines may require different operating systems (OSes) relative to other client machines on the same network. Examples of OSes include Linux, Windows or DOS to name just a few examples. In some networks, booting is performed using a preboot execution environment (PXE). PXE is an environment in which network computers may be booted via a network interface without regard to local OSes or storage devices such as local hard drives. Moreover, different client machines may need to boot different OSes from the same PXE server.

In such a network, managing a plurality of OSes on a single PXE server is a challenging problem. In known networks, different PXE OS images are hosted by the PXE server and client machines are booted based on the MAC address of a network card or IP range of the client system. If the MAC address or IP address of a client system changes, a PXE server side configuration change is required.

By way of example, a PXELINUX system will search for its config file on the boot server as follows. First, the system will search for the config file using the client universal unique identifier (UUID), if one is provided by the PXE stack. It should be noted that some basic input/output systems (BIOSes) do not have a valid UUID, and may substitute data such as all logical ones instead of data in standard UUID format using lower case hexadecimal digits. The system may then search for the config file using the hardware type using its address resolution protocol (ARP) type code and address, all in lower case hexadecimal with dash separators. For example, for an Ethernet (ARP type 1) with address 88:99:AA:BB:CC:DD, the system may search for the filename 01-88-99-aa-bb-cc-dd.

If no config file is found using these techniques, the system will search for the config file using its own IP address in upper case hexadecimal, e.g. 192.0.2.91->C000025B. The included program "gethostip" may be used to compute the hexadecimal IP address for any host. If a corresponding config file is not found using this technique, the system may remove one hex digit and try again. If the config file is not found, the system will eventually try looking for a file named "default" (in lower case).

The following list shows the order in which the config file will be searched for in a PXELINUX system having a boot file name of /mybootdir/pxelinux.0, a UUID of b8945908-d6a6-41a9-611d-74a6ab80b83d, an Ethernet MAC address of 88:99:AA:BB:CC:DD and an IP address of 192.0.2.91:

/mybootdir/pxelinux.cfg/b8945908-d6a6-41a9-611d-74a6ab80b83d
/mybootdir/pxelinux.cfg/01-88-99-aa-bb-cc-dd
/mybootdir/pxelinux.cfg/C000025B
/mybootdir/pxelinux.cfg/C000025
/mybootdir/pxelinux.cfg/C00002
/mybootdir/pxelinux.cfg/C0000
/mybootdir/pxelinux.cfg/C000
/mybootdir/pxelinux.cfg/C00
/mybootdir/pxelinux.cfg/C0
/mybootdir/pxelinux.cfg/C
/mybootdir/pxelinux.cfg/default Known attempts to identify an OS to boot using PXE where the UUID is used to identify the system to boot are inflexible because each machine is tied to a specific OS. Systems that use a MAC address are disadvantaged because server-side configuration changes are required if the network adapter is changed. Systems that use the client's IP address are disadvantaged because server-side configuration changes are needed when an associated DHCP server assigns a different IP address to the client.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

In accordance with an exemplary embodiment of the present invention, the need for server-side PXE setup/configuration changes are eliminated by predefining preboot data such as a state and/or an OS signature on a hard drive or any writable storage media (for example, flash memory or a USB drive) that may be read by PXE server-side code to determine the correct boot data such as the PXE OS for the client machine requesting to be booted. In one exemplary embodiment of the present invention, a PXE server sends a boot loader that is adapted to read the preboot data in response to a boot request. The preboot data is incorporated into a request for boot data that is returned to the PXE server.

A method in accordance with an exemplary embodiment of the present invention allows changing of the preboot data on the hard drive or writable storage media to define the boot data to be supplied the next time the client computer system is booted. In one exemplary embodiment of the present invention, the preboot data comprises an OS identifier. Changing the OS identifier on the clients storage medium will cause the client computer system to PXE boot any OS of choice. If no valid preboot information is found on the storage medium or if the PXE server is unable to detect or read the storage medium, the client computer system will boot a default PXE OS.

Figure 1:
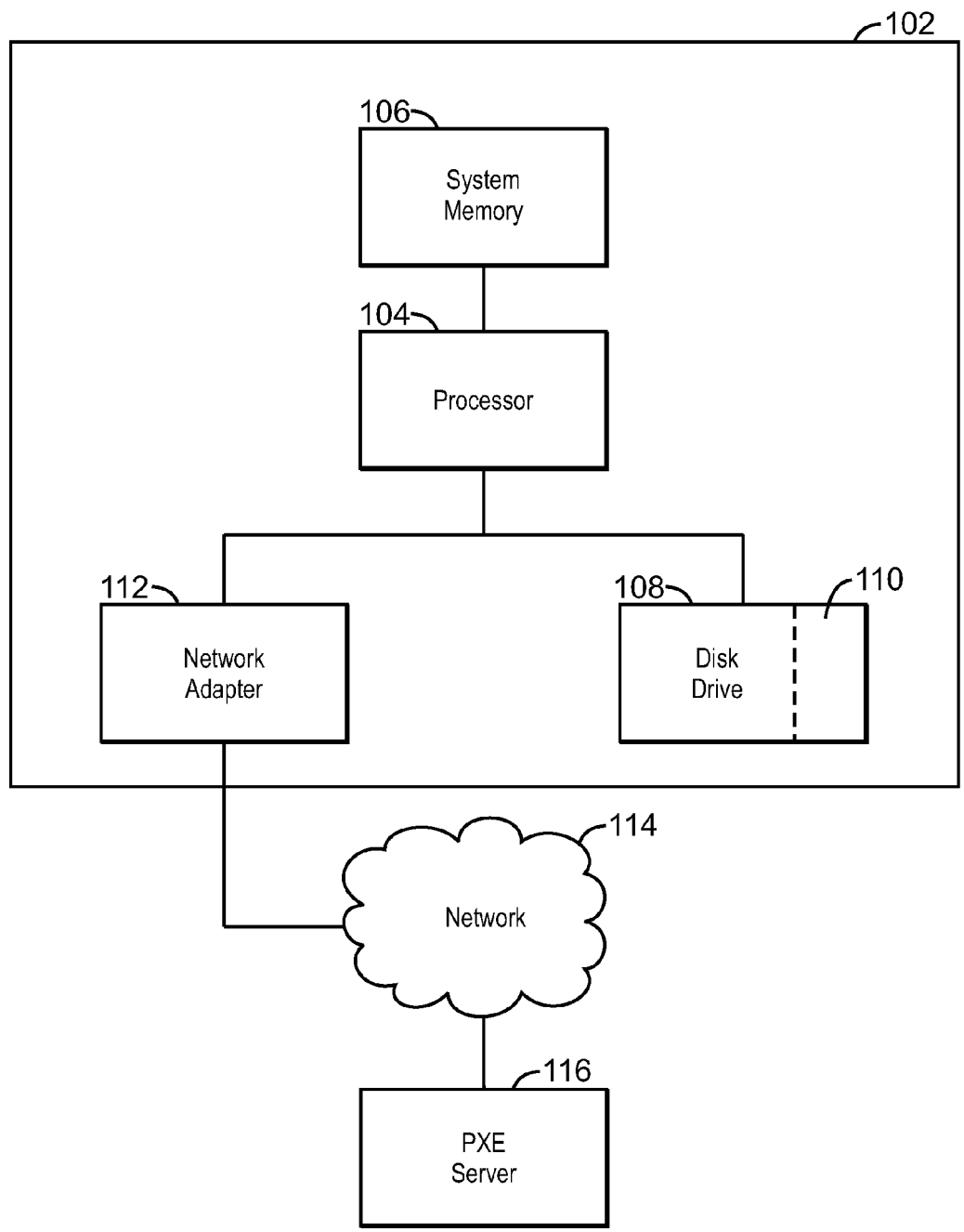
FIG. 1 is a block diagram of a computer network in which a client computer system boots from a PXE server in accordance with an exemplary embodiment of the present invention.

FIG. 1 is a block diagram of a computer network in which a client computer system boots from a PXE server in accordance with an exemplary embodiment of the present invention. The computer network is generally referred to by the reference number 100.

The computer network 100 comprises a client computer system 102. In an exemplary embodiment of the present invention, the client computer system 102 is adapted to boot using PXE, as fully described below. The client computer system 102 comprises a processor 104, which generally controls the overall operation of the system. The processor 104 is adapted to access a system memory 106, which may comprise random access memory (RAM). In addition, the processor 104 is adapted to access a disk drive 108. The disk drive 108 comprises a preboot data region 110. The preboot data region 110 is a region of the disk that stores preboot data. Preboot data stored in the preboot data region 110 is read by a preboot loader and transmitted to a server as part of a request for boot data.

In one exemplary embodiment of the present invention, the preboot data may comprise an OS identifier such as a predefined state or signature corresponding to an OS that is to be booted using PXE. Although the preboot data region 110 is illustrated as residing on a hard disk in the exemplary embodiment shown in FIG. 1, the preboot data region 110 may be located on other types of storage media such as a non-volatile memory, a USB drive, a DVD, a CD or the like.

The client computer system 102 includes a network adapter 112 that may be used to connect the client computer system 102 to a network 114. A PXE server 116 may have access to the client computer 102 via the network 114. Those of ordinary skill in the art will appreciate that the PXE server 116 may comprise a processor and one or more data storage devices for storing computer-readable instructions that govern its operation.

In an exemplary embodiment of the present invention, the client computer system 102 is booted using PXE. The PXE boot process is started when the client computer is powered on or reset. Initially, the client computer system 102 transmits a request to be booted to the PXE server 116. In response, the PXE server 116 sends a boot loader that is adapted to read preboot data stored in the preboot data region 110. The boot loader incorporates the preboot data into a request for boot data that is transmitted to the PXE server 116.

As set forth above, the preboot data may comprise an OS identifier that identifies a particular OS to use the next time the client computer system 102 is booted. The preboot data may also comprise a specific action to take the next time the client computer 102 is booted. Examples of actions that may be signaled by the preboot data include fixing file system errors, clearing out hard drives, performing customer image modifications or the like. The preboot data may signal that configuration files are to be modified by, for example, changing a network boot path, altering the machine hardware configuration for a virtual machine or the like. In one exemplary embodiment of the present invention, the preboot data may identify whether the client computer system 102 needs to be re-imaged and rebooted.

In an exemplary embodiment of the present invention in which the preboot data comprises an OS identifier, the client computer system 102 sends a boot request to the PXE server 116. In response, the PXE server 116 sends a boot loader that reads the OS identifier from the preboot data region 110. Upon reading the OS identifier, the boot loader incorporates it into a boot data request that is transmitted to the PXE server 116. In response, the PXE server 116 provides boot data comprising the OS identified by the OS identifier to the client computer system 102, which boots that OS.

In one exemplary embodiment of the present invention, the preboot data region 110 may comprise a predefined sector location of a hard drive. The preboot data region 110 may be read using a known method such as using INT13. PXELinux.asm modifications to read a first primary boot media are shown in the exemplary code set forth below. In the exemplary embodiment illustrated by the code, sector 63 offset 109 is used to define the tools environment type;

```
$Header: $
; build with : nasm -f bin -o loader.com -l comecho.lst comecho.asm
;
; COMBOOT program that just prints out its own command line.
; This also works in DOS.
;
org 100h
_start:
xor cx,cx
mov cl,[80h] ; Command line len
mov si,81h ; Command line
mov dl,"#" ; print delimiter token
mov ah,02h
int 21h
; copy the string at 0x80 to the zero terminated version in .data
.copystring
; lodsb
; mov [cmdline], al
; mov BYTE [cmdline+1], 0
; mov dx, cmdline
; mov ah,09h
; int 21h
; loop .copystring
; jmp complete
; restore state
; xor cx,cx
; mov cl,[80h] ; Command line len
; mov si,81h ; Command line
.writechar:
lodsb
mov dl,al
mov ah,02h
int 21h
loop .writechar
mov dx,end_str
mov ah,09h
int 21h
mov dx, loadmsg
mov ah,09h
int 21h
;; HP SPECIFIC PATCHES
;; first try system id thing
mov dx, chksysid
mov ah,09h
int 21h
mov ax, 0e800h
int 15h
jc check_mbr
; now try to set mfg mode
mov dx, chkmfg
mov ah,09h
int 21h
mov ax, 0000e845h
mov bh, 1h
mov bl, 1h
mov cx, 0006h
int 15h
jc check_mbr
; now reboot with a power cycle
mov dx, powercycle
mov ah,09h
int 21h
; Disable powercycle for now
; mov ax, 0xe826
; int 0x15
; check mbr
check_mbr:
mov dx, chkmbr
mov ah,09h
int 21h
mov ah, 2
mov al, 1
mov ch, 0
mov cl, 1
mov dh, 0
mov bx, 1000h
mov dl, 0x80
```

-continued

```
int 0x13
; jnc mbr_in_ok
cmp ah,0
je mbr_in_ok
jmp normal_process ; too far for normal jc call
mbr_in_ok:
cmp word [11feh], 0xaa55 ; check for magic checksum
je mbr_valid
jmp get_uia ; hop if no signature
mbr_valid:
mov dl,[11feh]
shr dl, 4 ; leave high part only.
add dl,030h
mov ah, 02h ; teletype sub-function.
int 21h
mov dl,[11feh]
and dl, 0fh ; leave high part only.
add dl,030h
mov ah, 02h ; teletype sub-function.
int 21h
mov dx, mbrsok
mov ah,09h
int 21h
mov di, 0 ; Set to zero
; check each of the slots for something valid
cmp byte [11beh], 80h
je mbr_bootable
cmp byte [11ceh], 80h
je mbr_bootable
cmp byte [11deh], 80h
je mbr_bootable
cmp byte [11eeh], 80h
je mbr_bootable
jmp get_uia
mbr_bootable:
mov dx, mbrok
mov ah,09h
int 21h
mov di, 1 ; Flag set to remember MBR is bootable
; now, pull in the cpq uia structure and see what the stage is...
get_uia:
mov DWORD [100dh],012345678h
mov ah, 2
mov al, 1
mov ch, 0
mov cl, 03fh
mov dh, 0
mov bx, 01000h
mov dl, 080h
int 013h
; jnc uia_in_ok
cmp ah,0
je uia_in_ok
mov dx, uiafail
mov ah,09h
int 21h
jmp normal_process
uia_in_ok:
; sometimes the uia in 63 isnt there - it really lives in 31 on raid drives
mov dl,[102eh]
shr dl, 4 ; leave high part only.
add dl,030h
mov ah, 02h ; teletype sub-function.
int 21h
mov dl,[102eh]
and dl, 0fh ; leave high part only.
add dl,030h
mov ah, 02h ; teletype sub-function.
int 21h
cmp dword [100dh], 55ff55ffh
je stage_check
mov dx, badusig
mov ah,09h
int 21h
mov ah, 2
mov al, 1
mov ch, 0
mov cl, 32
mov dh, 0
mov bx, 1000h
mov dl, 0x80
int 0x13
; jc normal_process
cmp ah,0
jne normal_process
mov dl,[1000h]
shr dl, 4 ; leave high part only.
add dl,030h
mov ah, 02h ; teletype sub-function.
int 21h
mov dl,[1000h]
and dl, 0fh ; leave high part only.
add dl,030h
mov ah, 02h ; teletype sub-function.
int 21h
; if we dont like this one, we have no options - bail
cmp dword [100dh], 55ff55ffh
je stage_check
mov dx, badusig
mov ah,09h
int 21h
jmp normal_process
stage_check:
cmp di,1 ; MBR should be bootable
jne normal_process
not_101: cmp word[102eh], 111
jne not_111
mov dx, s111
mov ah,09h
int 21h
jmp local_boot
not_111: cmp word[102eh], 222
jne not_222
mov dx, s222
mov ah,09h
int 21h
jmp local_boot
not_222: cmp word[102eh], 333
jne not_333
mov dx, s333
mov ah,09h
int 21h
jmp local_boot
not_333: cmp word[102eh], 444
jne normal_process
mov dx, s444
mov ah,09h
int 21h
jmp local_boot
hack_common:
normal_process:
mov dx, fnetwork ; print info to screen
mov ah,09h
int 21h
; mov ah,1 ; getchar
; int 021h
; mov ax,0fh ; get the ip information
; int 022h
;Check DSG
; cmp dword [1109h], 00475344h
; jne wpe
;Check WDT
cmp dword [1109h], 00544457h
jne linux
wpe:
mov cx,1
mov si,forcewpe
mov bx,fbwline ; Command line
mov edx,0
mov ax,16h
int 022h
jmp complete
linux:
mov cx,1
mov si,forceboot
mov bx,fbcline ; Command line
mov edx,0
mov ax,16h
```

-continued

```
int 022h
jmp complete
local_boot:
cmp di,1 ; MBR should be bootable
jne normal_process
mov dx, lboot
mov ah,09h
int 21h
; this is local boot - there is a getchar afterward to trap anything ugly
mov ax,014h
mov dx,0
int 022h
jmp complete
complete:
mov dx, lexit
mov ah,09h
int 21h
; getchar
mov ah, 1
int 21h
; Exit with near return, INT 20h, or INT 21h AX=4C00h
ret
end_str db ">", 0Dh, 0Ah, "$"
section .data
;cmdline: resb 128
forceboot db 'cpqpxe.1', 0, "$"
fbcline db 'nfsroot=ia32 irqfixup reboot=c,b', 0, "$"
forcewpe db 'pxeboot.0', 0, "$"
fbwline db 'initrd=tcpdos.1 floppy=0 keeppxe', 0, "$"
loadmsg db 0Dh, 0Ah, 'sosd intelligent loader - version 1.0004', "$"
chksysid db 0Dh, 0Ah, 'checking sysid support', "$"
chkmfg db 0Dh, 0Ah, 'checking mfgmode support', "$"
mbrsok db 0Dh, 0Ah, 'mbr signature seems okay...', "$"
powercycle db 0Dh, 0Ah, 'powercycling...', "$"
chkmbr db 0Dh, 0Ah, 'checking mbr...', "$"
uiafail db 0Dh, 0Ah, 'failed to read uia...', "$"
badusig db 0Dh, 0Ah, 'uia signature is invalid...', "$"
mbrok db 0Dh, 0Ah, 'mbr looks okay...', "$"
s111 db 0Dh, 0Ah, 'stage 111 - booting diags...', "$"
s222 db 0Dh, 0Ah, 'stage 222 - booting ghost...', "$"
s333 db 0Dh, 0Ah, 'stage 333 - booting lsdv...', "$"
s444 db 0Dh, 0Ah, 'stage 444 - booting postprocessing...', "$"
fnetwork db 0Dh, 0Ah, 'not usable state - network booting...', 0dh, 0ah, "$"
lboot db 0Dh, 0Ah, 'booting local disk...', "$"
lexit db 0Dh, 0Ah, 'exiting loader...', "$"
FailMBRRead db 0ah, 'Failed to read MBR ', 0
OkMBRRead db 0ah, 'MBR paged in...', 0
GoodMBR db 0ah, 'MBR seems valid.', 0
BadMBR db 0ah, 'MBR is garbage.', 0
Bootable db 0ah, 'MBR is bootable.', 0
NoBootable db 0ah, 'MBR is NOT bootable.', 0
UiaNoRead db 0ah, 'Unable to read UIA from disk', 0
UiaMissing db 0ah, 'UIA signature is bad.', 0
UiaSigIs db 0ah, 'UIA signature is: ', 0
UiaStageIs db 0ah, 'UIA stage is: ', 0
CallingOpen db 0ah, 'Calling open( )', 0
FetchingKernel db 0ah, 'Fetching CPQPXE.1...', 0
table db '0123456789abcdef'
```

Figure 2:
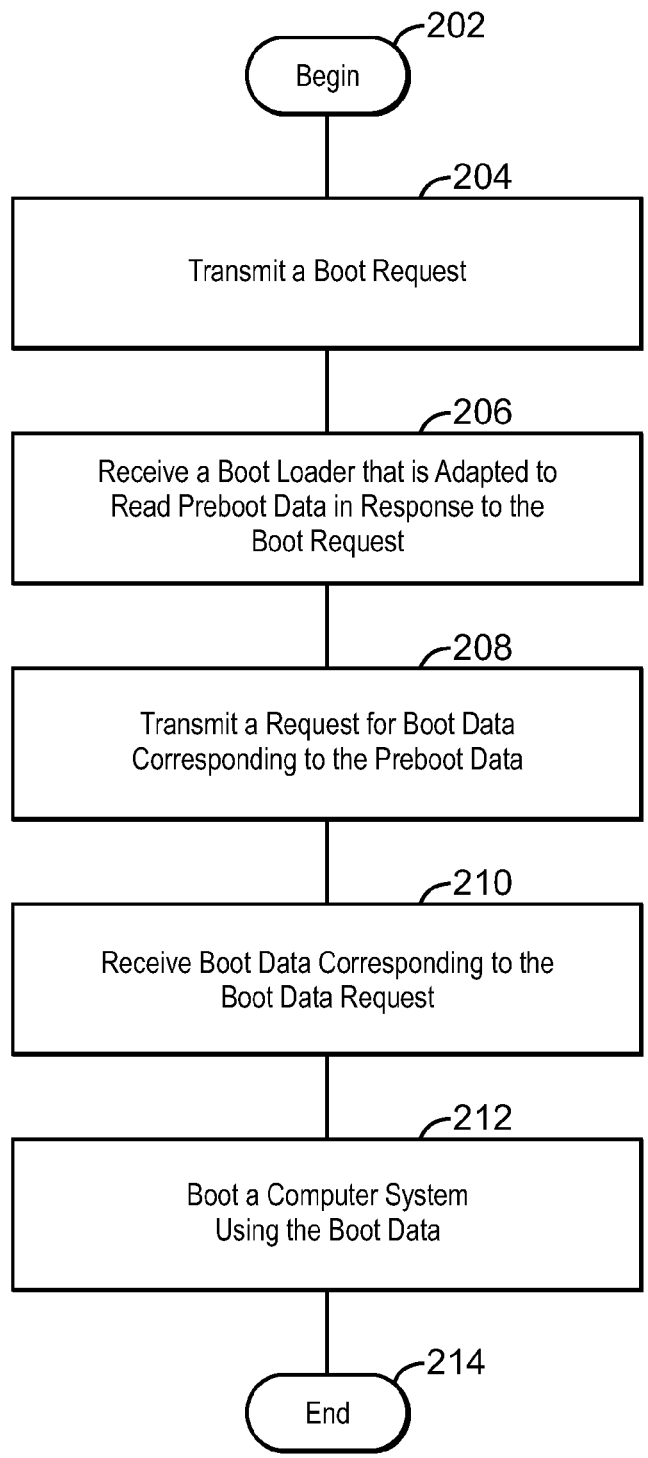
FIG. 2 is a process flow diagram showing a method of booting a computer system using preboot data in accordance with an exemplary embodiment of the present invention.

FIG. 2 is a process flow diagram showing a method of booting a computer system using preboot data in accordance with an exemplary embodiment of the present invention. The method is generally referred to by the reference number 200. At block 202, the method begins.

At block 204, a boot request is transmitted. In one exemplary embodiment of the present invention, the boot request is transmitted by a client computer system such as the client computer system 102 (FIG. 1). A boot loader that is adapted to read preboot data is received in response to the boot request, as shown at block 206. At block 208, a request for boot data corresponding to the preboot data is transmitted. In an exemplary embodiment of the present invention, the preboot data is transmitted to a PXE server such as the PXE server 116 (FIG. 1).

At block 210, boot data corresponding to the boot data request is received. The computer system is booted, as shown at block 212. At block 214, the method ends.

Figure 3:
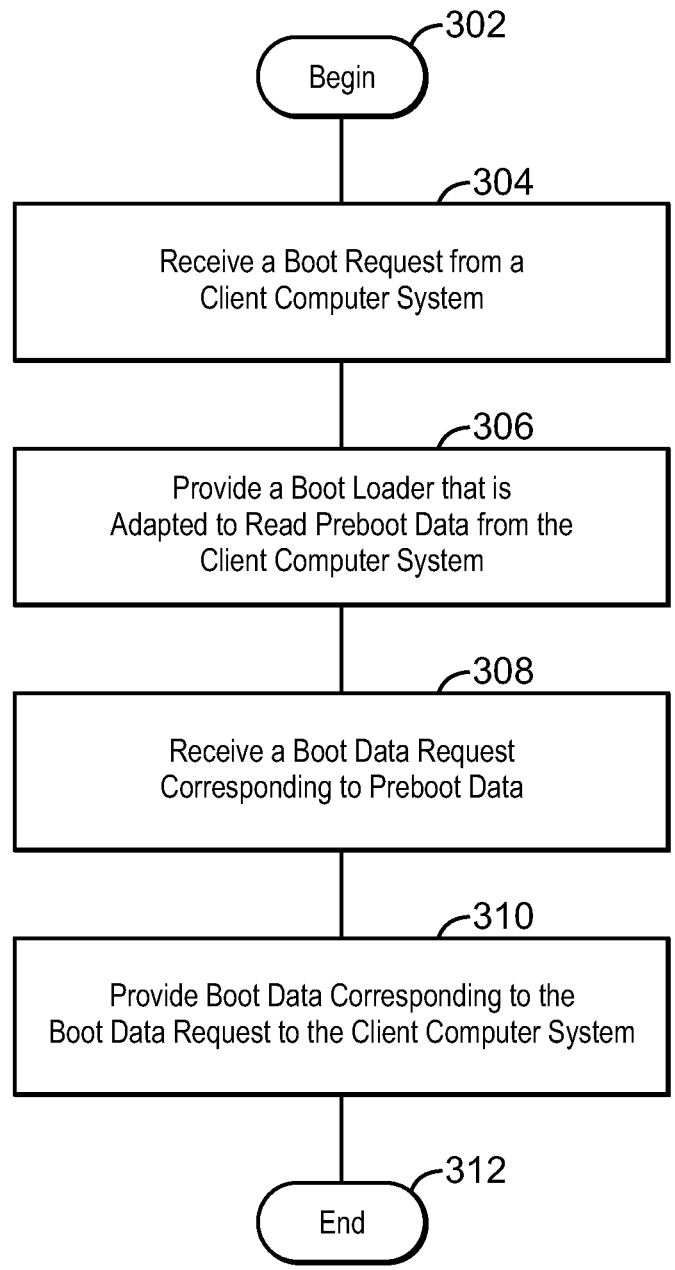
FIG. 3 is a process flow diagram showing a method of providing boot data corresponding to preboot data in accordance with an exemplary embodiment of the present invention.

FIG. 3 is a process flow diagram showing a method of providing boot data corresponding to preboot data in accordance with an exemplary embodiment of the present invention. The method is generally referred to by the reference number 300. In one exemplary embodiment of the present invention, the method 300 may be performed by a PXE server such as the PXE server 116 shown in FIG. 1. At block 302, the method begins.

A boot request is received from a client computer system, as shown at block 304. At block 306, a boot loader that is adapted to read preboot data is provided to the client computer system. A boot data request corresponding to the preboot data is received from the client computer system, as shown at block 308. Boot data corresponding to the boot data request is provided to the client computer system, as shown at block 310. In one exemplary embodiment of the present invention, the preboot data may comprise an OS identifier and the corresponding boot data may comprise the OS identified by the OS identifier.

Figure 4:
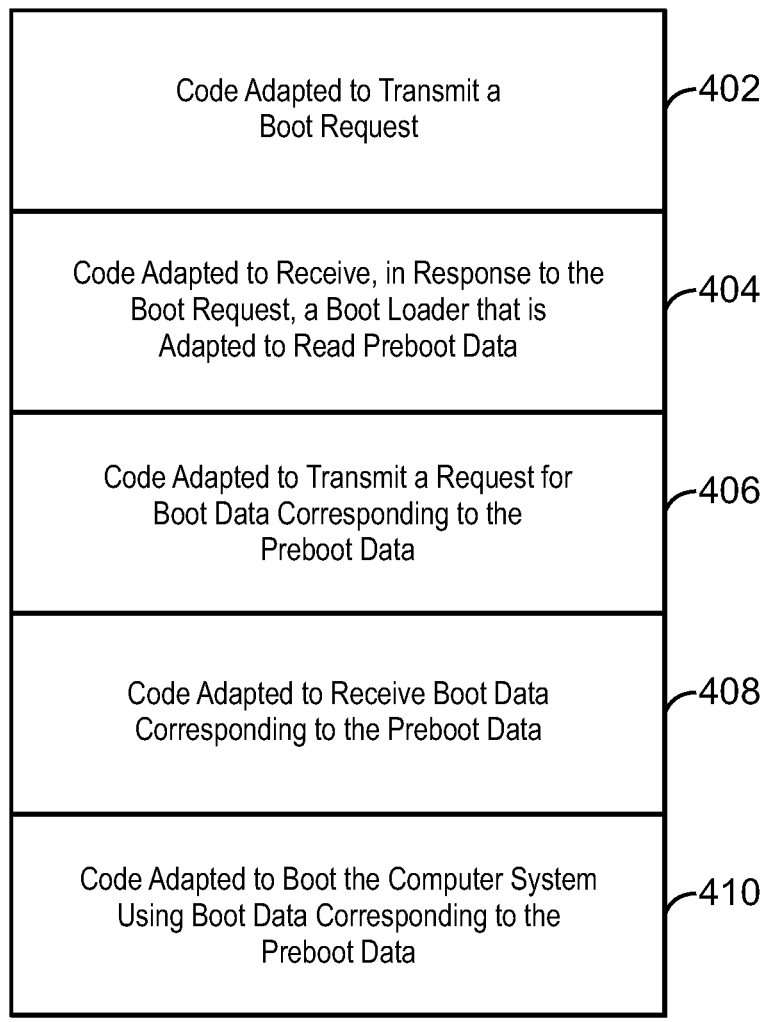
FIG. 4 is a block diagram showing a tangible, machine-readable medium that stores code adapted to facilitate the booting of a computer system in accordance with an exemplary embodiment of the present invention.

FIG. 4 is a block diagram showing a tangible, machine-readable medium that stores code adapted to facilitate booting of a computer system in accordance with an exemplary embodiment of the present invention. The tangible, machine-readable medium is generally referred to by the reference number 400. The tangible, machine-readable medium 400 may comprise one or more hard disk drives, a non-volatile memory, a USB drive, a DVD, a CD or the like. In one exemplary embodiment of the present invention, the tangible, machine-readable medium is accessible by the client computer system 102 (FIG. 1).

The exemplary tangible, machine-readable medium 400 stores code 402 that is adapted to transmit a boot request. Also stored on the tangible, machine-readable medium 400 is code 404 adapted to receive, in response to the boot request, a boot loader that is adapted to read preboot data. In one exemplary embodiment of the present invention, the boot loader comprises a modified PXE boot loader. The tangible, machine-readable medium 400 also stores code 406 that is adapted to transmit a request for boot data corresponding to the preboot data and code 408 that is adapted to receive boot data corresponding to the preboot data. Finally, code 410 that is adapted to boot the computer system using the boot data corresponding to the preboot data is stored on the tangible, machine-readable medium 400.

Those of ordinary skill in the art will appreciate that an exemplary embodiment of the present invention desirably allows client-side configuration of PXE boot parameters such as OS selection. Moreover, server-side configuration management may be eliminated. In one exemplary embodiment of the present invention, dynamic selection of a PXE boot OS is provided. In addition, an exemplary embodiment of the present invention provides flexibility by allowing the same client computer to boot different PXE OSes at different times. In this manner a manufacturing process may be improved. In addition, an exemplary embodiment of the present invention may provide automation and manageability of client computer systems. Such an exemplary embodiment may facilitate management of a virtual machine's OS images (for example, Win7, Vista, XP, Linux or the like) from a PXE environment on single physical hardware.

What is claimed is:

1. A method of booting a computer system using preboot data, the method comprising:
    transmitting a boot request;

receiving, in response to the boot request, a boot loader that is adapted to read the preboot data;

transmitting a request for a boot data corresponding to the preboot data, wherein the preboot data comprises a request to perform a specific action on the client computer system;

receiving the boot data corresponding to the preboot data; and booting the computer system using the boot data.

2. The method recited in claim 1, wherein the preboot data comprises an operating system (OS) identifier.

3. The method recited in claim 2, wherein the boot data comprises an OS identified by the OS identifier.

4. The method recited in claim 1, wherein the request comprises a request to modify a configuration file of the client computer system.

5. The method recited in claim 1, wherein the request comprises a request to re-image the client computer system.

6. The method recited in claim 1, wherein the preboot data is read from the client computer system in a pre-execution environment (PXE).

7. A method of providing a boot data corresponding to a preboot data to a client computer system, the method comprising:

receiving a boot request from the client computer system;

providing to the client computer system a boot loader that is adapted to read the preboot data, wherein the preboot data comprises a request to perform a specific action on the client computer system;

receiving a boot data request corresponding to the preboot data from the client computer system; and providing the boot data corresponding to the preboot data to the client computer.

8. The method recited in claim 7, comprising booting the client computer system using the boot data.

9. The method recited in claim 7, wherein the preboot data comprises an operating system (OS) identifier.

10. The method recited in claim 9, wherein the boot data comprises an OS identified by the OS identifier.

11. The method recited in claim 7, wherein the request comprises a request to modify a configuration file of the client computer system.

12. The method recited in claim 7, wherein the request comprises a request to re-image the client computer system.

13. A computer system, comprising:

a processor;

a tangible, machine-readable storage medium that stores tangible, machine-readable instructions for execution by the processor, the tangible, machine-readable instructions comprising code that is adapted to transmit a boot request, code that is adapted to receive, in response to the boot request, a boot loader that is adapted to read a preboot data, code that is adapted to transmit a request for a boot data corresponding to the preboot data, code adapted to receive the boot data corresponding to the preboot data, and code adapted to boot the computer system using the boot data, wherein the preboot data comprises a request to perform a specific action on the computer system.

* * * * *

UNITED STATES PATENT AND TRADEMARK OFFICE
CERTIFICATE OF CORRECTION

| | | |
|---|---|---|
| PATENT NO. | : 9,665,379 B2 | Page 1 of 1 |
| APPLICATION NO. | : 13/133944 | |
| DATED | : May 30, 2017 | |
| INVENTOR(S) | : Syed S. Azam et al. | |

It is certified that error appears in the above-identified patent and that said Letters Patent is hereby corrected as shown below:

In the Claims

In Column 8, Line 65, in Claim 1, delete "using preboot" and insert -- using a preboot --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*